United States Patent
Hulscher

(10) Patent No.: US 11,800,222 B2
(45) Date of Patent: Oct. 24, 2023

(54) VEHICULAR CAMERA WITH FOCUS DRIFT MITIGATION SYSTEM

(71) Applicant: Magna Electronics Inc., Auburn Hills, NC (US)

(72) Inventor: Evan T. Hulscher, Waterford, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 3 days.

(21) Appl. No.: 17/647,642

(22) Filed: Jan. 11, 2022

(65) Prior Publication Data

US 2022/0224824 A1 Jul. 14, 2022

Related U.S. Application Data

(60) Provisional application No. 63/199,588, filed on Jan. 11, 2021.

(51) Int. Cl.

| | |
|---|---|
| *H04N 23/67* | (2023.01) |
| *B60R 11/04* | (2006.01) |
| *G06T 7/80* | (2017.01) |
| *H04N 23/54* | (2023.01) |
| *H04N 23/50* | (2023.01) |
| *H04N 23/55* | (2023.01) |
| *H04N 23/57* | (2023.01) |

(52) U.S. Cl.
CPC .............. *H04N 23/67* (2023.01); *B60R 11/04* (2013.01); *G06T 7/80* (2017.01); *H04N 23/50* (2023.01); *H04N 23/54* (2023.01); *H04N 23/55* (2023.01); *H04N 23/57* (2023.01); *G06T 2207/30252* (2013.01)

(58) Field of Classification Search
CPC ........ H04N 23/67; H04N 23/50; H04N 23/54; H04N 23/55; H04N 23/57; H04N 23/60; H04N 23/673; H04N 23/90; B60R 11/04; B60R 2011/004; G06T 7/80; G06T 2207/30252

See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,715,093 A | 2/1998 | Schierbeek et al. |
| 5,760,962 A | 6/1998 | Schofield et al. |
| 5,796,094 A | 8/1998 | Schofield et al. |

(Continued)

FOREIGN PATENT DOCUMENTS

WO WO-2020103688 A1 * 5/2020 ........... G02B 27/646

*Primary Examiner* — Padma Haliyur
(74) *Attorney, Agent, or Firm* — HONIGMAN LLP

(57) ABSTRACT

A vehicular camera system includes a camera module disposed at a vehicle that captures image data. The camera module includes a printed circuit board (PCB) having an imager disposed thereat that includes an imaging array having at least one million photosensors arranged in rows and columns. The camera module includes a lens aligned with the imager. The system includes an electronic control unit (ECU) with electronic circuitry and associated software. With the camera module disposed at the vehicle, and responsive to images imaged at the imager not being focused, the vehicular camera system adjusts position of the imager relative to the PCB to bring images imaged at the imager into focus.

18 Claims, 5 Drawing Sheets

(56) References Cited

U.S. PATENT DOCUMENTS

| | | |
|---|---|---|
| 5,877,897 A | 3/1999 | Schofield et al. |
| 5,949,331 A | 9/1999 | Schofield et al. |
| 6,201,642 B1 | 3/2001 | Bos |
| 6,313,454 B1 | 11/2001 | Bos et al. |
| 6,320,176 B1 | 11/2001 | Schofield et al. |
| 6,353,392 B1 | 3/2002 | Schofield et al. |
| 6,369,954 B1 | 4/2002 | Berge et al. |
| 6,396,397 B1 | 5/2002 | Bos et al. |
| 6,498,620 B2 | 12/2002 | Schofield et al. |
| 6,559,435 B2 | 5/2003 | Schofield et al. |
| 6,590,719 B2 | 7/2003 | Bos |
| 6,690,268 B2 | 2/2004 | Schofield et al. |
| 6,717,610 B1 | 4/2004 | Bos et al. |
| 6,757,109 B2 | 6/2004 | Bos |
| 6,806,452 B2 | 10/2004 | Bos et al. |
| 6,822,563 B2 | 11/2004 | Bos et al. |
| 6,824,281 B2 | 11/2004 | Schofield et al. |
| 6,831,261 B2 | 12/2004 | Schofield et al. |
| 6,853,507 B2 | 2/2005 | Ryu et al. |
| 6,922,292 B2 | 7/2005 | Bos |
| 6,946,978 B2 | 9/2005 | Schofield |
| 7,004,606 B2 | 2/2006 | Schofield |
| 7,005,974 B2 | 2/2006 | McMahon et al. |
| 7,031,071 B2 | 4/2006 | Nishioka |
| 7,038,577 B2 | 5/2006 | Pawlicki et al. |
| 7,083,096 B2 | 8/2006 | Breytman et al. |
| 7,123,168 B2 | 10/2006 | Schofield |
| 7,382,545 B2 | 6/2008 | Jung et al. |
| 7,720,580 B2 | 5/2010 | Higgins-Luthman |
| 7,855,755 B2 | 12/2010 | Weller et al. |
| 7,965,336 B2 | 6/2011 | Bingle et al. |
| 8,179,438 B2 | 5/2012 | Hayakawa et al. |
| 8,542,451 B2 | 9/2013 | Lu et al. |
| 9,376,066 B2 | 6/2016 | Lu |
| 10,071,687 B2 | 9/2018 | Ihlenburg et al. |
| 10,099,614 B2 | 10/2018 | Diessner |
| 10,313,597 B2 | 6/2019 | Mleczko |
| 10,899,275 B2 | 1/2021 | Lu et al. |
| 2005/0167862 A1 | 8/2005 | Sano |
| 2005/0270486 A1 | 12/2005 | Teiwes et al. |
| 2006/0232670 A1 | 10/2006 | Chu |
| 2007/0279365 A1 | 12/2007 | Kageyama |
| 2008/0106811 A1 | 5/2008 | Eromaki |
| 2009/0244361 A1 | 10/2009 | Gebauer et al. |
| 2010/0007807 A1 | 1/2010 | Galstian et al. |
| 2010/0243862 A1 | 9/2010 | Nunnink |
| 2010/0265048 A1 | 10/2010 | Lu et al. |
| 2010/0289885 A1 | 11/2010 | Lu et al. |
| 2012/0062743 A1 | 3/2012 | Lynam et al. |
| 2012/0154591 A1 | 6/2012 | Baur et al. |
| 2012/0218414 A1 | 8/2012 | Bobbitt et al. |
| 2013/0258140 A1 | 10/2013 | Lipson et al. |
| 2014/0313337 A1 | 10/2014 | Devota et al. |
| 2014/0313339 A1 | 10/2014 | Diessner |
| 2014/0340510 A1 | 11/2014 | Ihlenburg et al. |
| 2015/0124098 A1* | 5/2015 | Winden .............. C09J 5/00 348/148 |
| 2015/0222795 A1 | 8/2015 | Sauer et al. |
| 2016/0006922 A1 | 1/2016 | Boudreau et al. |
| 2016/0268716 A1 | 9/2016 | Conger et al. |
| 2017/0048463 A1* | 2/2017 | Mleczko ............ H04N 23/51 |
| 2019/0306966 A1* | 10/2019 | Byrne ................ H04N 23/55 |
| 2021/0281761 A1* | 9/2021 | Wang ............ H01L 27/14636 |

\* cited by examiner

VEHICULAR CAMERA WITH FOCUS DRIFT MITIGATION SYSTEM

CROSS REFERENCE TO RELATED APPLICATION

The present application claims the filing benefits of U.S. provisional application Ser. No. 63/199,588, filed Jan. 11, 2021, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

A vehicular camera drift compensation system includes a camera module disposed at a vehicle that captures image data. The camera module includes a printed circuit board (PCB) having an imager disposed thereat that includes an imaging array may have at least one million photosensors arranged in rows and columns. The camera module includes a lens aligned with the imager. The system includes an electronic control unit (ECU) with electronic circuitry and associated software. With the camera module disposed at the vehicle, and responsive to images imaged at the imager not being focused, the vehicular camera system adjusts position of the imager relative to the PCB to bring images imaged at the imager into focus.

These and other objects, advantages, purposes and features of the present invention will become apparent upon review of the following specification in conjunction with the drawings.

DESCRIPTION OF THE PREFERRED EMBODIMENTS

A vehicle vision system and/or driver or driving assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
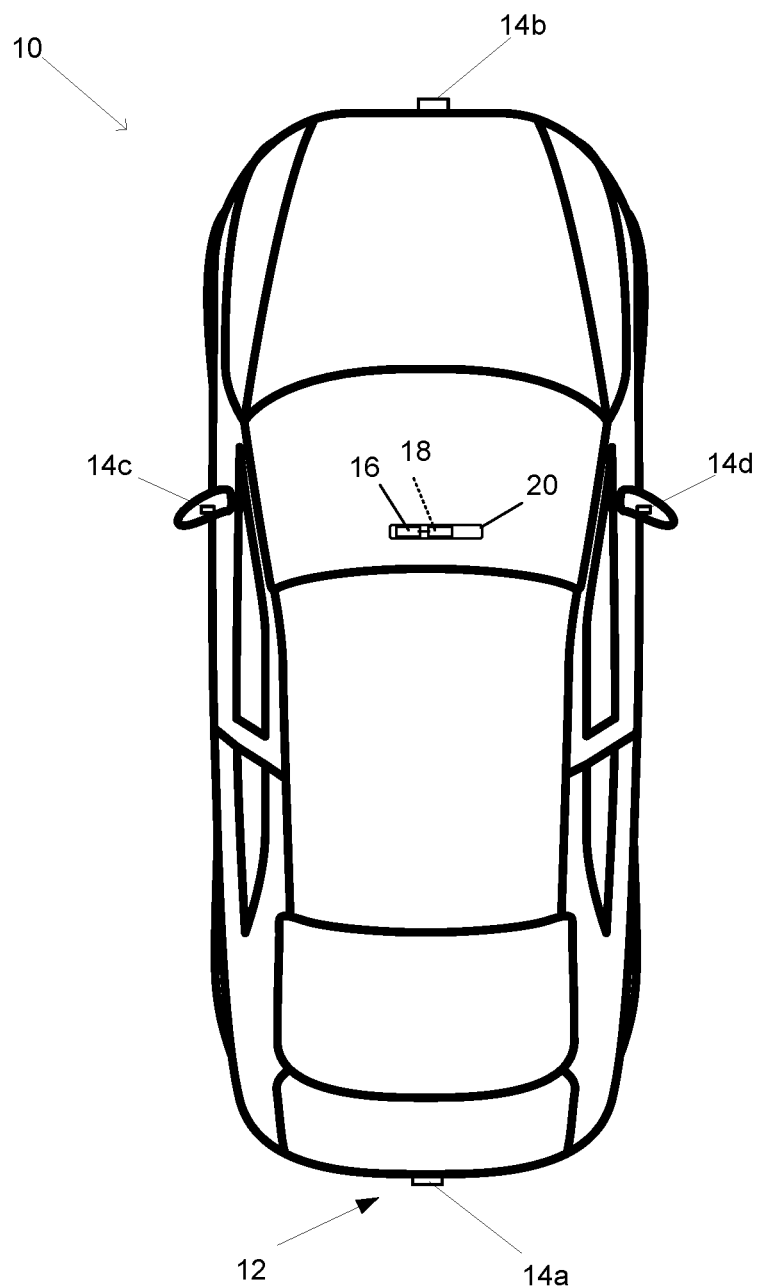
FIG. 1 is a plan view of a vehicle with a vision system that incorporates cameras.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) 18 having electronic circuitry and associated software, with the electronic circuitry including a data processor or image processor that is operable to process image data captured by the camera or cameras, whereby the ECU may detect or determine presence of objects or the like and/or the system provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Figure 2:
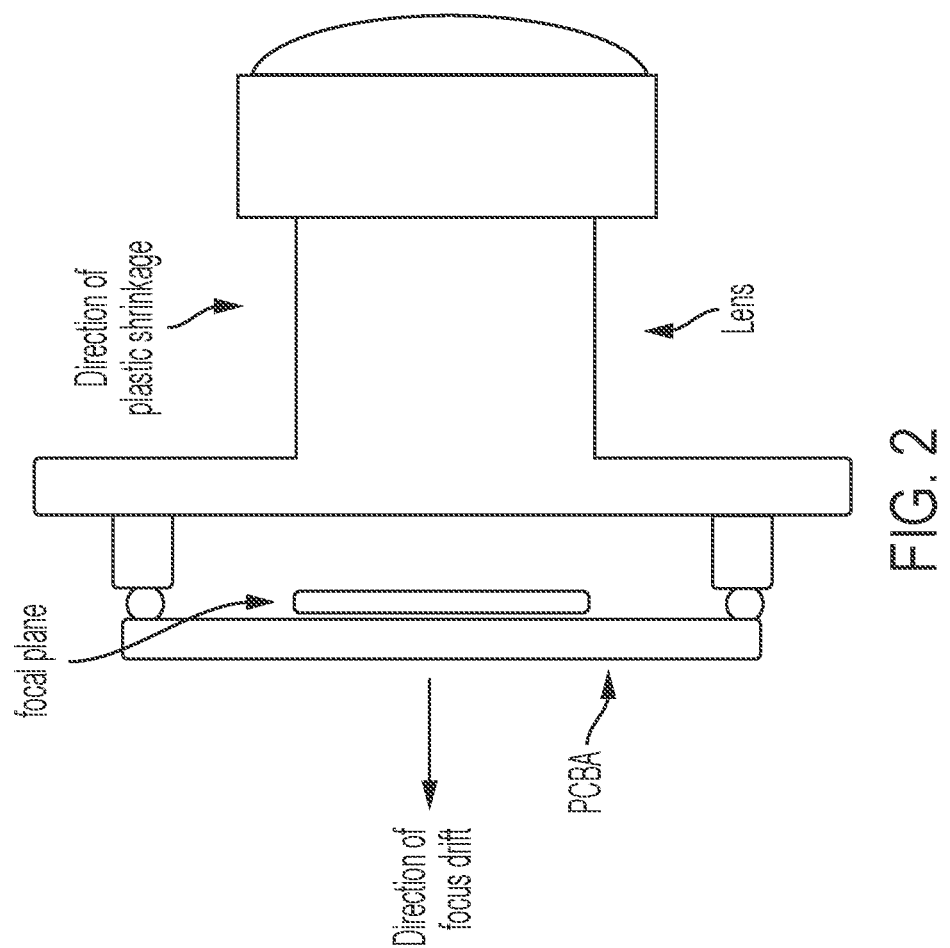
FIG. 2 is a plan view of an imager mounted to a printed circuit board and aligned with a lens.

Referring now to FIG. 2, typical vehicular cameras (e.g., reverse backup cameras disposed at a rear of a vehicle, a forward viewing camera disposed at a front of the vehicle, etc.) are made with housings designed and manufactured using injection molded plastics. This is generally because plastic is relatively inexpensive and only requires a single tool to fabricate millions of parts. However, polymers have the inherent and unfortunate quality of shrinking over time. This shrinkage flexes the printed circuit board assembly (PCBA) of the camera that houses the imager, and the flexing results in misalignment of the imager with the optimal focal plane (i.e., causes misalignment of the camera by shifting the alignment between the imager and the lens). For example, the imager may move closer or further away from the lens (i.e., move along the focal axis) or, in some examples, the imager may move laterally relative to the focal axis. For example, plastic of a barrel of the lens may shrink or expand, thereby increasing or decreasing the distance between the lens and the imager. This means that the image produced by the camera may degrade over time (i.e., as the plastic or other material shrinks and the lens and imager become misaligned). Thus, compensating for this shift dynamically not only adds value to the camera, but also enhances the camera's lifespan.

Implementations herein accommodate for such shrinkage of the plastic housing by providing a micro-electro-mechanical system (MEMS) based control system that monitors focus shift and compensates using the principle of electrostatic actuation. This approach differs from conventional compensation methods in that the actuation occurs at the image sensor level as opposed to a lens actuated approach (i.e., moving the focal plane instead of the sensor). Traditionally, a suite of cameras are built around one imager and several lenses depending on field of view (FOV) needs for each application. Modifying each of these lenses with an auto-focus actuator would be expensive, and each would have unique challenges for size and amount of displacement needed. Instead, investing in the image sensor may have a greater potential for re-use across multiple different cameras, lenses, and systems, thereby decreasing cost and reducing design times.

In a complementary metal oxide semiconductor (CMOS) imager, the die of the imager is attached to a substrate and bond wires are attached to bond pads allowing the imager to pass and receive electrical signals and power through the ball grid array (BGA) solder connections below and to the output display, microcontroller, etc.

Figure 3:
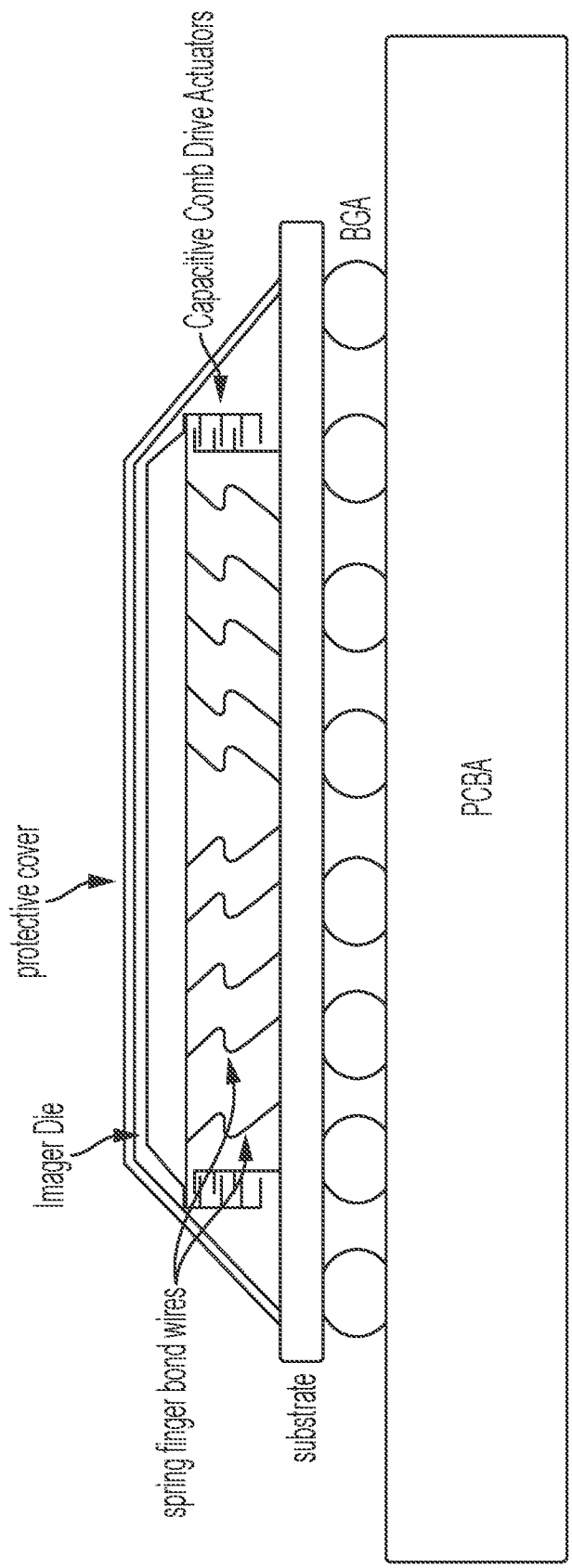
FIG. 3 is a plan view of an imager offset from substrate via actuators.

Referring now to FIG. 3, implementations herein include a vehicular camera drift compensation system that modifies the imager and imager PCB with the capability to offset the imager die itself relative to the PCB substrate the imager is mounted to using capacitive comb drives (or other microelectromechanical actuators) which move the imager die up and down to achieve optimum focus using electrostatic forces. Since, in this scenario, the die is floating (relative to the PCB), the conventional rigid encapsulated bond wire die/substrate interface is replaced with a spring wire interface so that the electrical connections between the imager and the PCB can move up and down with the die as the comb drives change its position (i.e., stretch and contract). The MEMS based control system operates to adjust the imager die relative to the imager substrate (i.e., by moving the imager closer and further away from the PCB), which is soldered to the imager PCB via the BGA solder connections. The MEMS based control may utilize aspects of the controller described in U.S. Pat. No. 10,313,597, which is hereby incorporated herein by reference in its entirety.

Thus, the drift mitigation system corrects or accommodates focus shift due to coefficient thermal expansion (CTE) mismatch (i.e., temperature influenced focus shift due to expansion/contraction of one component relative to another component of the camera that results in a change in focus) in, for example, a housing or casing of a camera. The ability to adjust the imager or sensor (i.e., relative to the PCB) to optimize focus may also reduce cost by enabling the manufacturer to source less expensive lenses with shallower depths of focus and less expensive materials that may be less stable with changes in temperature. That is, some cameras may require more expensive materials because of the need to reduce thermal expansion/contraction, but because the drift mitigation system described herein compensates for the thermal expansion/contraction, less expensive materials may be substituted.

Figure 4:
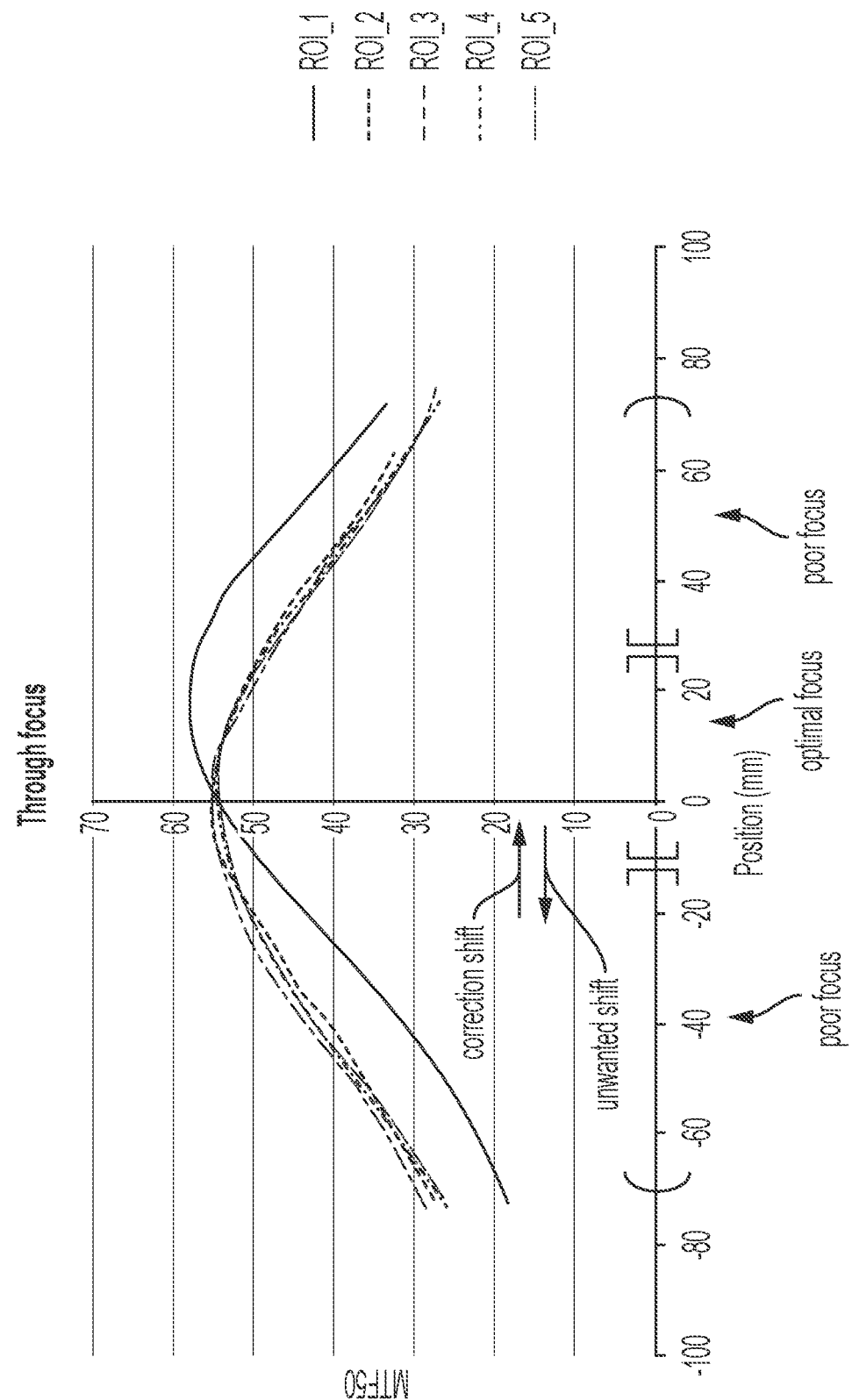
FIG. 4 is a graph of optimal focus versus poor focus of the imager of FIG. 2.
Figure 5:
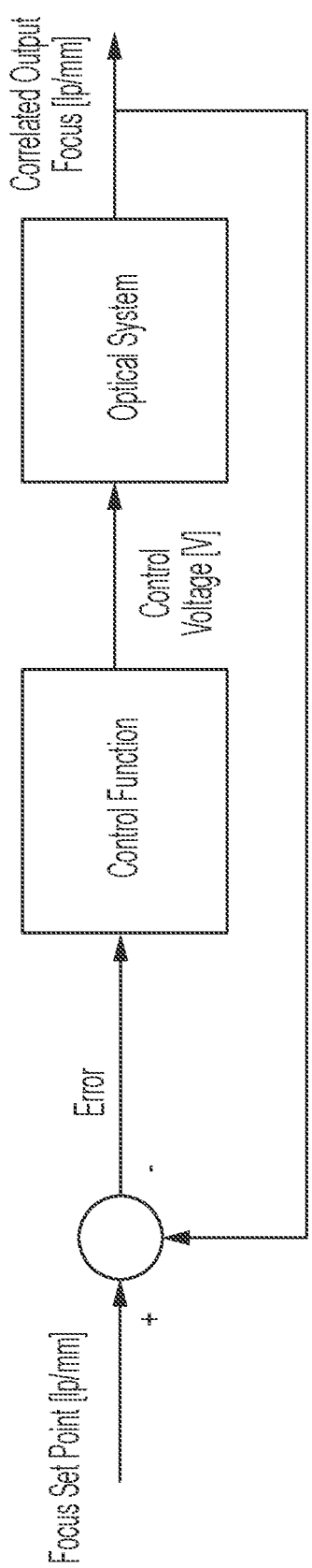
FIG. 5 is a block diagram of a vehicular camera drift compensation.

Additionally, because in typical lens applications, there is no local maxima for a given region of interest, and the system includes a simple feedback control algorithm to monitor and correct the measured focus for the optical system (FIGS. 4 and 5). The control measures the imager position derived from correlation of the through focus curve of the given lens design. That is, the system processes image data captured by the camera to determine a current focus of the camera. The control output variable is the voltage (charge) between each half of the comb drive fingers (i.e., capacitive or piezoelectric actuation). That is, the control may adjust the position of the imager die relative to the substrate and PCB by causing the spring fingers to contract or expand based on an electric charge supplied to the spring fingers in order to adjust the position of the imager relative to the PCB and thereby adjust the focus. For example, when the control measures the current focus in a "poor focus" area of the focus curve (FIG. 4), the system may adjust the focus by lengthening or shortening the distance between the imager and the PCB to adjust the focus into the "optimal focus" area. Optionally, the system may determine a distance or spacing or gap size between the imager and the lens or lens holder when the camera is assembled and set to be at its optimum focus. The system may (with the camera installed at a vehicle) adjust the gap size responsive to determination that the gap size is different from the initial, optimum focus gap size by at least a threshold amount.

Optionally, the control algorithm may control the movement of the imager die using thermal actuation. For example, the control may allow current to flow through the spring fingers (consisting of layers of silicon and metals or "memory metals") which in turn heats up the spring fingers, causing them to expand and adjust the position of the imager die (relative to the substrate and the PCB). As shown in FIG. 5, an area is designated as optimal focus and areas outside of the optimal focus are designated as poor focus. An unwanted shift in focus (e.g., from expansion/contraction of materials) leads to an unwanted shift which the system compensates for by performing a corresponding correction shift in the opposite direction, thus returning the focus to optimal.

In addition to the feedback control, on start up the control may perform a full range sweep of die position to evaluate the optimal set point for maximizing focus and settling so that for the duration of the power cycle actuation is minimized. That is, the control may adjust the imager die to each position along a range of all possible positions that the control is capable of adjusting the imager die to (i.e., a maximum distance between the imager and the PCB to a minimum distance between the imager and PCB). The control may determine the optimal focus while adjusting the imager position along the range of all possible positions (e.g., by processing image data captured by the camera at each of the positions).

Thus, the drift mitigation system described herein corrects poor focus of a camera by controlling an offset of an imager die from the substrate via capacitive comb drive actuators. Spring finger bond wires maintain connection between the imager die and the substrate. The system moves just the die within the imager package (i.e., the system moves the die relative to the imager substrate and imager PCB, which may be fixed relative to the lens holder and lens of the camera assembly). The system thus provides enhanced focus stabilization via actuating the imager die and not the lens or the entire component. By moving just the die and not the entire imager PCB relative to the lens, the system is less affected by vibration and temperature changes due to the lower mass and size of the die as compared to the entire imager PCB and imager. The system may be thermally actuated or electrically actuated (capacitive or piezoelectric).

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S.

Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular camera system, the vehicular camera system comprising:
   a camera module disposed at a vehicle equipped with the vehicular camera system, the camera module capturing image data;
   wherein the camera module comprises a printed circuit board (PCB) having an imager disposed thereat;
   wherein the imager comprises an imaging array having at least one million photosensors arranged in rows and columns;
   wherein the camera module comprises a lens aligned with the imager;
   an electronic control unit (ECU) comprising electronic circuitry and associated software; and
   wherein the camera module comprises a capacitive comb drive actuator;
   wherein, with the camera module disposed at the vehicle, and responsive to determination that images imaged at the imager are not in focus, the vehicular camera system adjusts position of the imager relative to the PCB to bring images imaged at the imager into focus by controlling a voltage between each half of each capacitive comb drive actuator.

2. The vehicular camera system of claim 1, wherein the imager comprises an imager die and a substrate, and wherein the vehicular camera system adjusts the position of the imager relative to the PCB by adjusting the imager die relative to the substrate.

3. The vehicular camera system of claim 2, wherein the capacitive comb drive actuator offsets the imager die from the substrate.

4. The vehicular camera system of claim 3, wherein the vehicular camera system adjusts an amount of current supplied to the at least on actuator to adjust the position of the imager die relative to the substrate.

5. The vehicular camera system of claim 2, wherein the imager die is electrically connected to the substrate via spring finger bond wires.

6. The vehicular camera system of claim 2, wherein the substrate is attached to the PCB via a solder ball grid array.

7. The vehicular camera system of claim 1, wherein the vehicular camera system determines focus of the imager based on a correlation of the through focus curve of the lens.

8. The vehicular camera system of claim 1, wherein the vehicular camera system, responsive to power being applied to the camera module, determines focus of the imager based on adjusting the imager relative to the PCB to all possible positions within a range of positions.

9. The vehicular camera system of claim 1, wherein the vehicular camera system adjusts the position of the imager relative to the PCB by (i) increasing distance between the imager and the PCB and decreasing distance between the imager and the lens or (ii) decreasing distance between the imager and the PCB and increasing distance between the imager and the lens.

10. The vehicular camera system of claim 1, wherein the vehicular camera system determines focus of images imaged at the imager via processing at the ECU of image data captured by the camera module.

11. The vehicular camera system of claim 1, wherein the vehicular camera system determines distance between the lens and the imaging plane when the images imaged at the imager are in focus, and wherein the vehicular camera system determines that images imaged at the imager are out of focus by (i) determining a current distance between the lens and the imaging plane and (ii) comparing the current distance and the determined distance when the images imaged at the imager are in focus.

12. The vehicular camera system of claim 1, wherein the camera module comprises the ECU.

13. A vehicular camera system, the vehicular camera system comprising:
a camera module disposed at a vehicle equipped with the vehicular camera system, the camera module capturing image data;
wherein the camera module comprises a printed circuit board (PCB) having an imager disposed thereat;
wherein the imager comprises an imaging array having at least one million photosensors arranged in rows and columns;
wherein the camera module comprises a lens aligned with the imager;
an electronic control unit (ECU) comprising electronic circuitry and associated software;
an actuator operable to move the imager relative to the PCB and the lens, and wherein the actuator comprises a capacitive comb drive actuator; and
wherein, with the camera module disposed at the vehicle, and responsive to determination that images imaged at the imager are not in focus, the vehicular camera system adjusts, using the actuator, position of the imager relative to the PCB and the lens to bring images imaged at the imager into focus by controlling a voltage between each half of each capacitive comb drive actuator.

14. The vehicular camera system of claim 13, wherein the vehicular camera system adjusts an amount of current supplied to the actuator to adjust the position of the imager relative to the PCB and the lens.

15. A vehicular camera system, the vehicular camera system comprising:
a camera module disposed at a vehicle equipped with the vehicular camera system, the camera module capturing image data;
wherein the camera module comprises a printed circuit board (PCB) having an imager disposed thereat;
wherein the imager comprises an imaging array having at least one million photosensors arranged in rows and columns;
wherein the camera module comprises a lens aligned with the imager;
an electronic control unit (ECU) comprising electronic circuitry and associated software;
wherein the camera module comprises a capacitive comb drive actuator;
wherein the vehicular camera system, responsive to power being applied to the camera module, determines focus of the imager based on adjusting the imager relative to the PCB to all possible positions within a range of positions; and
wherein, with the camera module disposed at the vehicle, and responsive to determination that images imaged at the imager are not in focus, the vehicular camera system adjusts position of the imager relative to the PCB to bring images imaged at the imager into focus by controlling a voltage between each half of each capacitive comb drive actuator, and wherein the vehicular camera system adjusts the position of the imager relative to the PCB by (i) increasing distance between the imager and the PCB and decreasing distance between the imager and the lens or (ii) decreasing distance between the imager and the PCB and increasing distance between the imager and the lens.

16. The vehicular camera system of claim 15, wherein the imager comprises an imager die and a substrate, and wherein the vehicular camera system adjusts the position of the imager relative to the PCB by adjusting the imager die relative to the substrate.

17. The vehicular camera system of claim 16, wherein the capacitive comb drive actuator offsets the imager die from the substrate.

18. A vehicular camera system, the vehicular camera system comprising:
a camera module disposed at a vehicle equipped with the vehicular camera system, the camera module capturing image data;
wherein the camera module comprises a printed circuit board (PCB) having an imager disposed thereat;
wherein the imager comprises an imaging array having at least one million photosensors arranged in rows and columns;
wherein the camera module comprises a lens aligned with the imager;
an electronic control unit (ECU) comprising electronic circuitry and associated software;
wherein, with the camera module disposed at the vehicle, and responsive to determination that images imaged at the imager are not in focus, the vehicular camera system adjusts position of the imager relative to the PCB to bring images imaged at the imager into focus;
wherein the imager comprises an imager die and a substrate, and wherein the vehicular camera system adjusts the position of the imager relative to the PCB by adjusting the imager die relative to the substrate;
wherein at least one actuator offsets the imager die from the substrate;
wherein the at least one actuator comprises a capacitive comb drive actuator; and
wherein the vehicular camera system adjusts the position of the imager relative to the PCB by controlling a voltage between each half of each capacitive comb drive actuator.

* * * * *